United States Patent Office 2,702,006
Patented Feb. 15, 1955

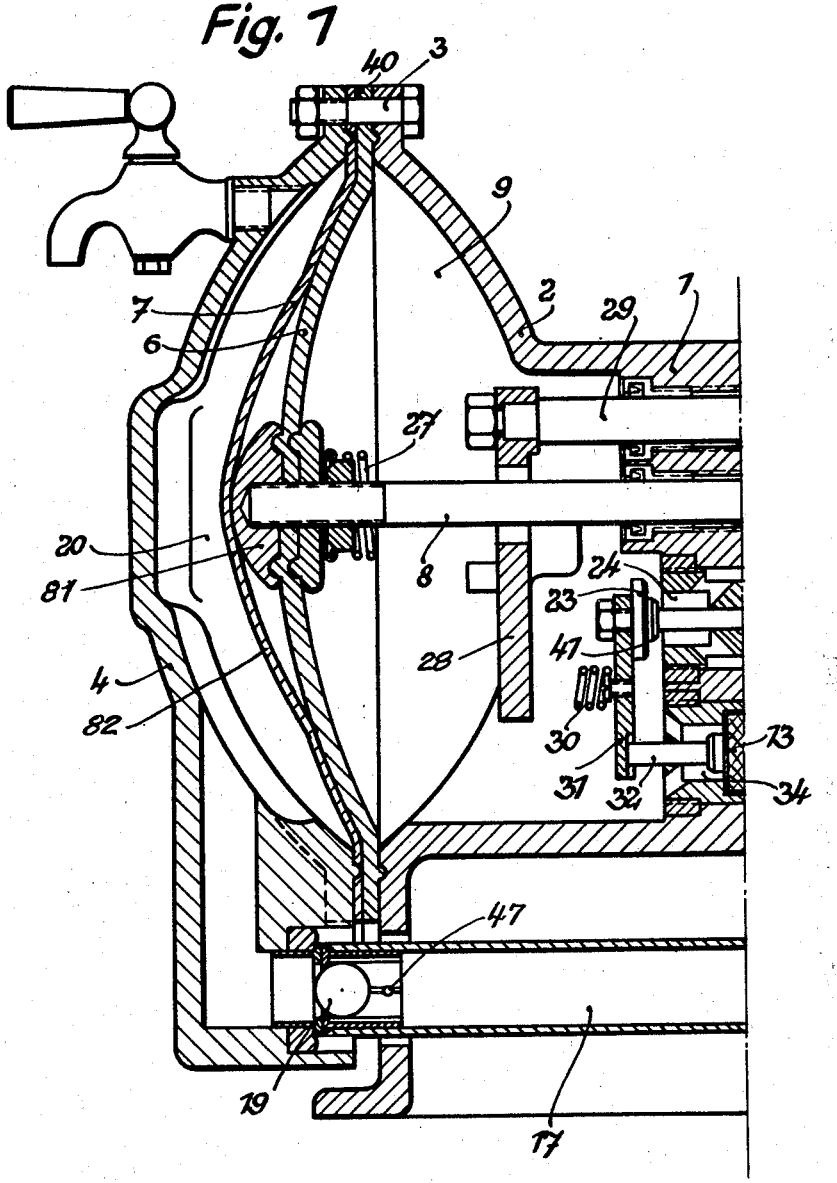

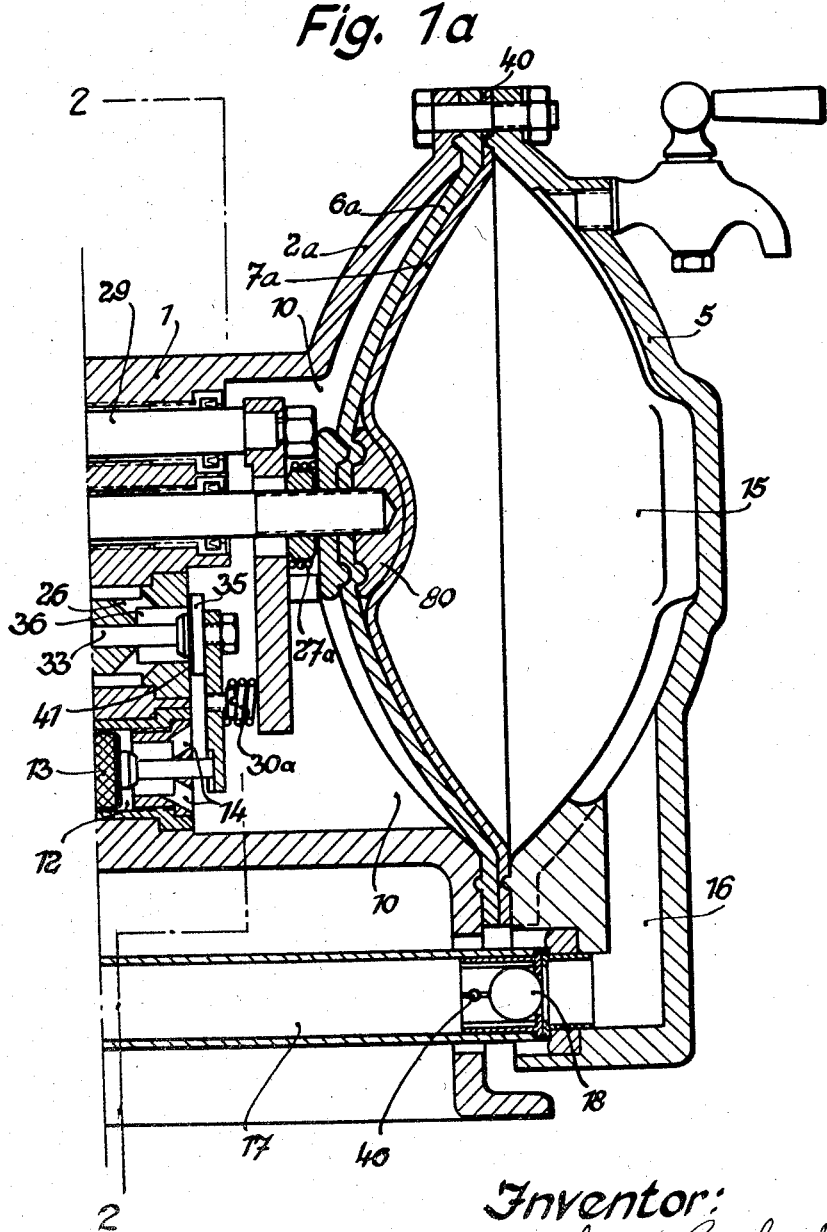

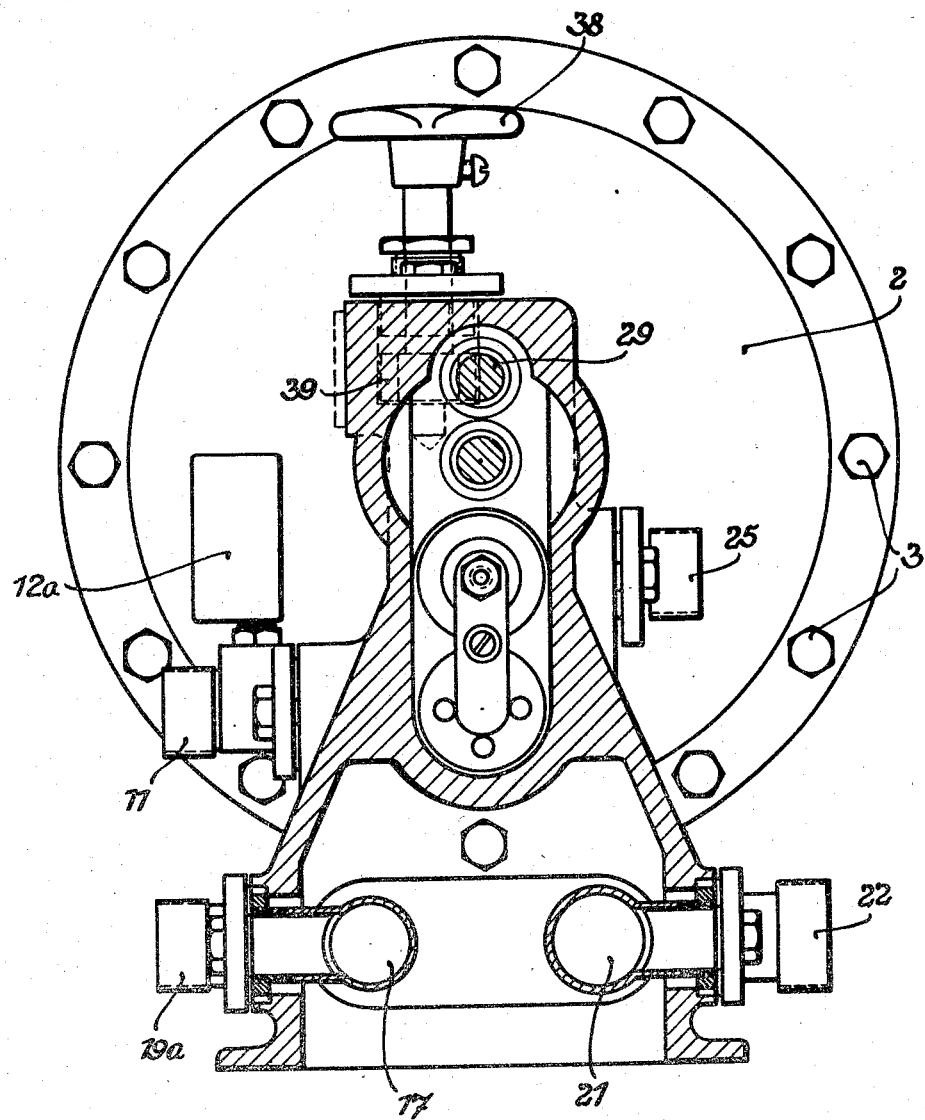

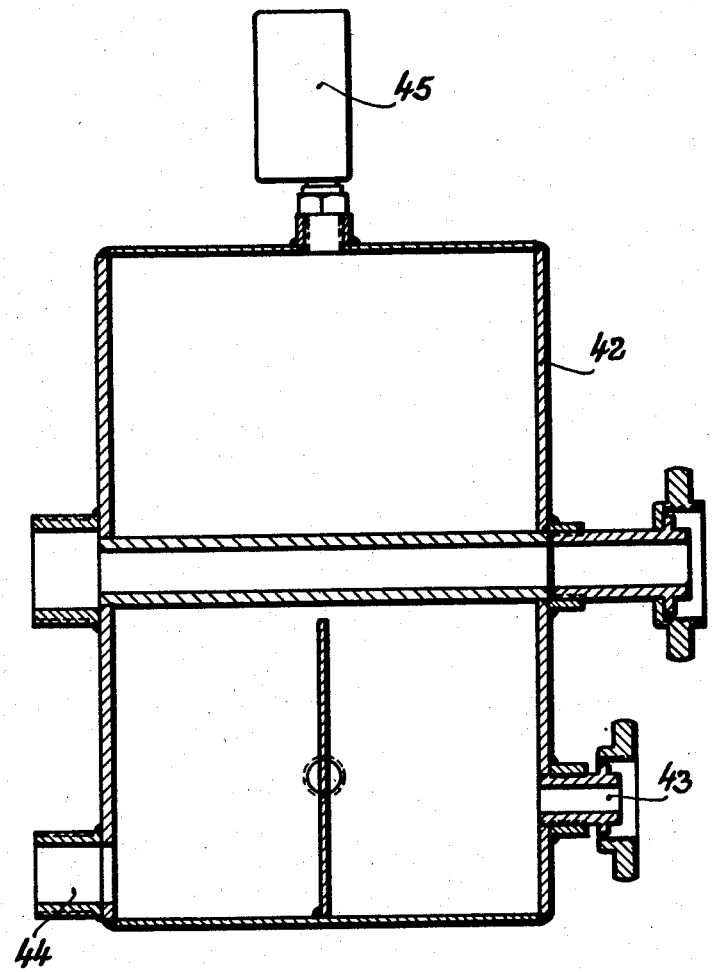

2,702,006

MEANS FOR DELIVERING BRINE UNDER PRESSURE FOR INJECTION PICKLING

Arthur Bachert, Essen-Heisingen, Germany

Application June 8, 1951, Serial No. 230,499

Claims priority, application Germany June 12, 1950

1 Claim. (Cl. 103—150)

This invention relates to devices for supplying brine or the like used for pickling meat, and in particular to brine supplying means which convey the brine under the increased pressure requisite for so-called injection pickling.

It is known to pickle joints of meat by injecting the pickling brine at increased pressure into the inner parts of the meat, for example by means of hollow needles which are stuck into the meat.

The invention relates to devices with which a liquid having a corroding action, such as pickling brine, can be supplied at increased pressure in order to deliver it to the injection passages.

More particularly, the invention relates to pressure supply means which have two oppositely operating, single acting diaphragm pumps the diaphragms of which are interconnected, as by a rod, a control valve actuated by the diaphragm movement controlling the admission of the pressure medium, for example water under pressure, and the outflow of the pressure medium released from pressure, for example waste water.

The purpose of the invention is to provide such improvements in brine supplying means as will give increased safety against the penetration of pressure medium into the pickling brine.

A further object of the invention is to construct the supply means in such a way that upon leakage of the flexible diaphragm limiting the pressure medium chamber the movement of the pickling brine automatically comes to an end.

Other important objects of the invention will be evident from the following general description of the invention and the description of the preferred form of construction of the invention illustrated in the drawing.

An essential characteristic of the invention consists in that the pressure supply means is provided with multi-layer diaphragms which are preferably connected with each other at the edge by vulcanization or other suitable means, whilst the connecting rod is connected with one diaphragm only which is covered against the pickling brine or other corroding liquid by one or more other diaphragms which are not connected with the rod. In this way the intermediate space between the diaphragm layers is closed to the outside so that the loose diaphragm layers are taken along by the reduced pressure existing in the intermediate space.

The essential advantage of the employment of multi-layer diaphragms consists in that for transmitting the pressure and tractive forces to the piston rod it is possible to employ a type of rubber of high mechanical strength but which, as is well known, has a smaller resistance to chemical attack, whilst on the other hand, it is protected against the attack of the pickling brine by a chemically resistant but mechanically weaker diaphragm layer.

The arrangement of a multi-layer diaphragm, of whose layers that, at least, closing off the pickling brine chamber is not connected with the connecting rod, has in addition the advantage that upon leakage of the most strongly loaded membrane which is connected with the rod, the supply is automatically interrupted. In this case there can be no production of reduced pressure in the intermediate space between the diaphragm layers, so that the layer separating the brine chamber cannot be taken along therewith.

The diaphragm is also preferably constructed, according to the invention, so that an inversion does not need to be made upon reversal of movement, as with the dish shaped construction usually employed hitherto. The diaphragm according to the invention is thus made practically flat or with only a slight curvature. It is distinguished by a considerably increased life.

In order to ensure that the brine supplying means or the like according to the invention delivers the supplied liquid with a practically uniform pressure the invention employs an air vessel in the discharge of the liquid (brine) to be supplied, the reaction of the air chamber on the method of operation of the control of the means for supplying the brine being avoided by bypass passages between the delivery and the suction chamber in the pressure valves, so that the brine discharges from the air chamber at a practically uniform pressure.

The invention furthermore extends to the employment of a novel control for the pressure medium which is essentially characterised by the employment of rubber packing members for sealing the end face. Also according to the invention the free cross section of the suction opening for pickling brine or the like is greater than the cross section of the outlet for the brine.

In the drawings,

Figure 1 shows a longitudinal section through one side of a brine delivery means according to the invention.

Figure 1a is a sectional view similar to Figure 1 of the opposite end portion of the brine delivery means.

Figure 2 shows a cross section on the line 2—2 of Figure 1a.

Figure 3 shows a section through an air vessel to be connected with the delivery means according to Figures 1 and 1a.

The delivery means illustrated in Figures 1 and 1a has a housing 1 consisting of cast iron or the like which extends at two opposite sides in cup shaped extensions 2, 2a. At the edge of the extensions 2, 2a there is fixed on each by means of screws 3 a cover 4, 5 for example of a corrosion resisting material such as stainless steel. Between the covers 4, 5 and the housing extensions 2, 2a respectively there is a rubber diaphragm consisting of two layers, 6, 7 and 6a, 7a, the inner layers 6 and 6a consisting of rubber resistant to mechanical strain and the other outer diaphragm 7, 7a of a soft rubber plate. The diaphragms 6, 6a are connected with each other by a rod 8 in such a way that they can reciprocate in synchronism.

The cylinder chambers 9, 10 limited by the diaphragms 6, 6a receive the pressure medium, for example water under pressure which enters through the branch 11 on which a manometer 12a is provided in order to ascertain the liquid pressure at any given time. The branch 11 opens into a chamber 12 in which there is displaceably arranged a piston valve 13 consisting of a solid rubber mass. From the chamber 12 the pressure medium passes, in the position of the piston 13 illustrated in Figures 1 and 1a, through passages 14 into the cylinder chamber 10, so that the right hand diaphragm 6a is forced by the pressure medium towards the right (Fig. 1a). As a result the diaphragm 6a takes with it the diaphragm 7a which compresses the pickling brine existing in the cylinder chamber 15, which accordingly passes through the passage 16 into pipe 17 after opening the ball valves 18 and from thence to the outlet branch 19a to which is connected the flexible pipe leading to the hollow needle.

Whilst the right hand diaphragm 6a is moved towards the right from the position shown in Fig. 1a the rod 8, which is secured to the diaphragm 6a by nut 80, moves therewith and the rod 8 takes with it the diaphragm 6 which is secured by nut 81 towards the right. As, by the increased pressure in the pipe 17 the ball valve 19 is closed, the movement of the diaphragm 6 towards the right has the effect that a reduced pressure is produced in the cylinder chamber 20. On this account the diaphragm 7 which is hermetically sealed at its edge with the diaphragm 6, is moved away slightly from the diaphragm 6, as indicated at 82 in Fig. 1.

The reduced pressure resulting in the cylinder chamber 20 opens another ball valve which controls the connection of the pipe 21 with the cylinder chamber 20 so that the reduced pressure is transmitted to the pipe 21 from which leads a branch pipe 22 to which is connected a pipe or hose leading to the supply vessel for the brine. As a result of the reduced pressure in the pipe 21 the connection of the pipe 21 with the piston chamber 15 is also interrupted.

The pressure medium flowing into the cylinder chamber 10 thus moves both diaphragms synchronously from the one end position shown in Figures 1 and 1a, into the opposite end position, whereby the brine from the chamber 15 is compressed and forced into the spray passages whilst fresh brine from the supply vessel is sucked into the cylinder chamber 20 and vice versa. Simultaneously the pressure medium which can flow away in the waste water opening 24, controlled by the valve 23, and which is for its part connected with the waste water pipe branch 25 through the passages 26, is removed from the cylinder chamber 9.

If for any reason the diaphragms 6, 6a or one of them start to leak, so that pressure medium can pass into the space between the diaphragms 6a, 7a or 6, 7 the delivery of brine quickly stops. No reduction of pressure can take place in the said intermediate space which will take with it the diaphragm 7a or 7, so that no brine is sucked into the cylinder chamber 15 or 20.

As soon as the spring 27 arranged on the left side of the piston rod 8 abuts against the left arm 28 of the control rod 29 and has reached a certain tension the rod 29 is moved from the position shown in Fig. 1 towards the right, whereby the arm 28 abuts against the spring 30 of a transverse member 31 which connects the valve rods 32 and 33. As the control piston 13 is loaded on its right hand side by the pressure medium, resistance is made to the displacement of piston 13 and assumed compressed positions such as illustrated by springs 27a and 30a.

When the tension of the springs 27, 30 has reached a sufficient value the control piston 13 is moved from its seat and thus decreases the pressure in the chamber 12. The result is that the control piston, whilst releasing the tension of the springs 27, 30 is moved with great speed into its other end position, so that the medium can then flow through the passages 34 into the cylinder chamber 9 and the movement of the diaphragms and the piston rod 8 takes place in the opposite direction.

Simultaneously with the reversal of the control piston 13 the waste water valve 23 is closed and the valve 35 is raised from its seat by means of the valve rod 33. Liquid can then flow away from the cylinder chamber 10 through the passages 36 and 26, from where the waste water flows away through the branch pipe 25.

In the manner described, a reciprocatory movement of the diaphragms 6, 7 and 6a, 7a is produced so long as the device remains connected to the pressure medium supply.

The position of the control at any time is indicated through a handle 38, which is connected through a gear 39 with gearing cut in the central rod 29. The control may in addition be regulated externally by means of the handle. It is also possible according to the invention to connect with the handle 38 or the control rod 29 a counting mechanism which indicates the number of strokes of the piston rod 8 and therefore the volume of brine supplied.

As can be seen in particular from Fig. 2 the cross section of the pipe 21 and the valve connected with it, i. e. the cross-section of the passage of the brine to the suction side is made greater than that of the pipe 17 and the ball valve 18, 19 on the pressure side. In this way there is obtained a more uniform and higher output of the brine delivery means.

The cylinder chambers 9, 20 or 10, 15 are made comparatively flat. In this way it is possible to employ flat or only slightly curved diaphragms 6, 7, 6a, 7a which—as has been found—have a considerably greater life than the cup-shaped diaphragms usual hitherto.

The diaphragms 6, 7, 6a, 7a are connected to each other at the edge, as indicated at 40 by vulcanization or in any other suitable manner.

An essential advantage of the control for the pressure medium shown in Figs. 1 and 1a is that the sealing is here effected by the end faces of the rubber piston 13 and through rubber packing discs 41 which rest on the plate valves 23, 35. By the employment of this rubber body the troublesome grinding-in of the valves and the like which was usual hitherto is avoided and the preparation of the control is considerably simplified and cheapened.

The brine after discharge from the pressure branches 19a is preferably supplied to an air chamber 42, which is illustrated in Fig. 3. The brine enters for example through the pipe branch 43 into the closed vessel 42 from which it flows out through the branch pipe 44. In the vessel 42 a cushion of air forms above the liquid level which expands upon reversal of the diaphragm pump and ensures a uniform discharge of the brine through the branch pipe 44. The pressure of the cushion of air and thus the pressure of the pickling brine at any time may be accurately measured by a manometer 45.

The vessel 42 moreover serves with advantage to separate air or gas bubbles which may be contained in the pickling brine. These collect in the upper part of the vessel and may be removed therefrom from time to time by a valve, not shown.

In order to prevent the air chamber causing an interruption in the method of operation of the diaphragm pump by-pass passages 46, 47 are preferably provided on the ball valves 18, 19, to connect the delivery and suction side of the ball valves and permit a slight fluid exchange.

I claim:

A hydraulic apparatus of the class described including a housing having chambers formed in the opposite ends thereof, an inner diaphragm and an outer flexible diaphragm in each of said chambers, extending across said chambers so as to divide the same into a fluid pressure compartment and a brine receiving compartment, means connecting the outer edges of the inner and outer diaphragms in each chamber together so that the intermediate portions thereof are free and independently movable, means connecting the diaphragms to the housing, a longitudinally disposed reciprocating rod connected to the inner diaphragms to provide two oppositely operating single acting diaphragm pumps, a brine inlet pipe, a spaced brine discharge pipe, said pipes communicating with each of the brine receiving compartments, pressure operated valves in each of said pipes, said housing having a longitudinal passage communicating with said fluid pressure compartments, a reciprocating piston valve in said passage, means operable by the displacement of the inner diaphragms for controlling the actuation of said piston valve, means for supplying fluid under pressure into said fluid compartments, a fluid discharge pipe communicating with each of said fluid pressure chambers, and valve means operable by movement of the diaphragms for controlling the flow through said discharge pipe.

References Cited in the file of this patent

UNITED STATES PATENTS

| | | |
|---|---|---|
| 326,545 | Class | Sept. 22, 1885 |
| 514,608 | Weatherhead | Feb. 13, 1894 |
| 1,198,971 | Taylor | Sept. 19, 1916 |
| 2,148,957 | Morris | Feb. 28, 1939 |
| 2,625,886 | Browne | Jan. 20, 1953 |

FOREIGN PATENTS

| | | |
|---|---|---|
| 283,021 | Great Britain | Jan. 5, 1928 |